United States Patent
Lin et al.

(10) Patent No.: US 9,796,805 B2
(45) Date of Patent: Oct. 24, 2017

(54) AMINOPLAST CROSSLINKER RESIN COMPOSITIONS, PROCESS FOR THEIR PREPARATION, AND METHOD OF USE

(71) Applicants: Allnex IP S.a.r.l., Luxemburg (LU); Allnex Austria GmbH, Werndorf (AT)

(72) Inventors: Lon-Tang Wilson Lin, Bethel, CT (US); Kuang-Jong Wu, Easton, CT (US); Katsumi Inagaki, Yamaguchi (JP); Johann Billiani, Graz (AT)

(73) Assignees: ALLNEX AUSTRIA GMBH, Werndorf (AT); ALLNEX IP S.A.R.L., Luxemburg (LU)

( * ) Notice: Subject to any disclaimer, the term of this patent is extended or adjusted under 35 U.S.C. 154(b) by 551 days.

(21) Appl. No.: 14/352,459

(22) PCT Filed: Oct. 21, 2012

(86) PCT No.: PCT/EP2012/070833
§ 371 (c)(1),
(2) Date: Apr. 17, 2014

(87) PCT Pub. No.: WO2013/057303
PCT Pub. Date: Apr. 25, 2013

(65) Prior Publication Data
US 2014/0302241 A1 Oct. 9, 2014

Related U.S. Application Data

(60) Provisional application No. 61/549,926, filed on Oct. 21, 2011.

(30) Foreign Application Priority Data

Feb. 14, 2012 (EP) ..................... 12155473

(51) Int. Cl.
| | |
|---|---|
| *C08G 12/42* | (2006.01) |
| *C08G 12/30* | (2006.01) |
| *B05D 3/02* | (2006.01) |
| *C08G 12/32* | (2006.01) |
| *C08L 61/00* | (2006.01) |
| *C08G 16/02* | (2006.01) |
| *C08G 16/04* | (2006.01) |
| *C09D 161/34* | (2006.01) |
| *C08G 12/00* | (2006.01) |
| *B05D 7/06* | (2006.01) |
| *B05D 7/12* | (2006.01) |
| *B05D 7/14* | (2006.01) |
| *C09D 161/28* | (2006.01) |

(52) U.S. Cl.
CPC ........... *C08G 12/32* (2013.01); *B05D 3/0254* (2013.01); *B05D 7/06* (2013.01); *B05D 7/12* (2013.01); *B05D 7/14* (2013.01); *C08G 12/00* (2013.01); *C08G 16/0225* (2013.01); *C08G 16/0268* (2013.01); *C08G 16/04* (2013.01); *C08L 61/00* (2013.01); *C09D 161/28* (2013.01); *C09D 161/34* (2013.01)

(58) Field of Classification Search
CPC .... C08G 12/32; C08G 12/00; C08G 16/0225; C08G 16/0268; C08G 16/04; C09D 161/34; C09D 161/28; C08L 61/00; C08L 101/06; C08L 67/04; B05D 7/14; B05D 7/12; B05D 3/0254; B05D 7/06
USPC ...... 427/388.3, 385.5, 389, 389.9, 391, 393; 524/542; 528/254
See application file for complete search history.

(56) References Cited

U.S. PATENT DOCUMENTS

| | | | |
|---|---|---|---|
| 3,322,762 A * | 5/1967 | Alden | C07D 251/70 528/254 |
| 4,145,513 A | 3/1979 | Dalibor | |
| 4,837,278 A | 6/1989 | Cameron et al. | |
| 4,903,440 A * | 2/1990 | Larson et al. | C09K 3/1427 51/295 |
| 5,376,504 A | 12/1994 | Graziano et al. | |
| 2002/0000536 A1 | 1/2002 | Spitz et al. | |

FOREIGN PATENT DOCUMENTS

| | | |
|---|---|---|
| EP | 0 407 086 | 1/1991 |
| EP | 1 607 391 | 12/2005 |

OTHER PUBLICATIONS

International Search Report dated Apr. 15, 2013 in International (PCT) Application No. PCT/EP2012/070833.

* cited by examiner

*Primary Examiner* — William Cheung
(74) *Attorney, Agent, or Firm* — Wenderoth, Lind & Ponack, L.L.P.

(57) ABSTRACT

This invention relates to aminoplast crosslinker resins compositions based on at least partially alkylated reaction products A of melamine, formaldehyde and an alkanol with the following parameters: the ratio of the amount of substance $n(CH_2O)$ of combined formaldehyde to the amount of substance $n(Mel)$ of melamine is in the range of from 5.6 mol/mol to 6.2 mol/mol, the ratio of the amount of substance $n(RO)$ of alkyl ether groups in the crosslinker resin to the amount of substance $n(Mel)$ of melamine is in the range of from 5.0 mol/mol to 5.6 mol/mol, the mass fraction of monomer in the resin, calculated as the ratio of the mass of monomer $m(1)$ to the mass $m(A)$ of the reaction products A is between 35% and 55%, to a process for their preparation, and to a method of use thereof as crosslinker in combination with hydroxy-functional polymers for coating of heat-sensitive substrates.

18 Claims, No Drawings

AMINOPLAST CROSSLINKER RESIN COMPOSITIONS, PROCESS FOR THEIR PREPARATION, AND METHOD OF USE

FIELD OF THE INVENTION

This invention relates to aminoplast crosslinker resin compositions, particularly those based on alkoxymethyl melamine, and methods of making and using such crosslinker resins in coating compositions.

BACKGROUND OF THE INVENTION

Aminoplast crosslinker resins, particularly optionally etherified resins derived from melamine and formaldehyde, have been used in many industrial coating applications on substrates such as wood and metals, for fields such as automotive, appliances, and coil coating, as crosslinkers to form coating films comprising a reticulated three-dimensional polymer network. Functional groups of aminoplast crosslinker resins can react with functional groups of the binder resins, particularly hydroxyl groups, as well as with themselves in a self-condensation reaction. Aminoplast crosslinker resins are usually mixtures of monomeric and oligomeric molecules.

In the case of melamine formaldehyde resins, the melamine unit comprises a heterocyclic six-membered triazine ring of alternating carbon and nitrogen atoms where each of the three ring carbon atoms has a pendant nitrogen atom which is not part of the triazine ring and can link to two functional groups, by substitution of the hydrogen atoms bound to these nitrogen atoms in melamine. Thus, each monomeric melamine unit has six functional groups. In the synthesis of melamine and formaldehyde based amino crosslinker resins, melamine is reacted with formaldehyde to form a mixture of different methylol melamines, where at least one molecule of formaldehyde is reacted under addition to the aminic nitrogen atom to form a so-called N-methylol group of the formula >N—$CH_2$—OH, up to hexamethylol melamine where all of the aminic nitrogen atoms carry two methylol groups. Reaction of more than six formaldehyde molecules is also possible, under formation of structures such as >N—$CH_2$—(O—$CH_2$)$_n$—OH, with n being 0 for a N-methylol group, or larger that 0, i. e. 1 or more where oligoacetal groups are formed. The methylol compound may then be reacted with an aliphatic alcohol, preferably methanol, n-butanol, or isobutanol, or mixtures of these, to form a mixture of etherified methyolmelamines, e.g., in a stoichiometry of 1 mol of melamine combined with 6 mol of formaldehyde and 6 mol of the aliphatic alcohol, R—OH, hexa-alkoxymethyl melamine where each of the aminic nitrogen atoms carry two alkoxymethyl groups —N($CH_2$—OR)$_2$.

The reaction of melamine with formaldehyde and alcohols can thus provide a variety of functional groups attached to the pendant nitrogen atoms including groups which represent bridges between triazine units. These functional groups include imino (>N—H), oligoacetal (>N—$CH_2$[O—$CH_2$]$_n$—O—H), alkoxyoligoacetal (>N—$CH_2$[O—$CH_2$]$_n$—OR), alkoxymethyl (>N—$CH_2$—OR), methylene ether bridge (>N—$CH_2$—O—$CH_2$—N<), methylene bridge (>N—$CH_2$—N<) and methylol (>N—$CH_2$—OH) groups. The methylene ether bridge and methylene bridge link individual melamine units into oligomeric species which contain more than one triazine moiety in one molecule, which are usually referred to as dimers, trimers, etc.

Erikson et al. disclose in U.S. Pat. No. 3,322,762 the production of "substantially hexakis (methoxymethyl) melamine". The synthesis thereof involves reacting a melamine molecule having six methylol groups per molecule with excess methanol, in this case, at least 20 moles of methanol per 1 mole of melamine, at a pH between about 1 and 3 to produce a "fully methylated" hexakis (methoxymethyl) melamine. The product can be dissolved in water in amount of up to a mass fraction of solids of 33% in water at 25° C.

Graziano et al. disclose in U.S. Pat. No. 5,376,504 the recovery of monomeric hexamethoxymethyl melamine from byproducts of synthesis by batch distillation of a commercial highly methylolated and highly etherified melamine formaldehyde resin, for use in preparing photoresists having improved sensitivity and shelf life.

As also oligomeric derivatives of alkoxymethyl melamine are useful crosslinking agents, there has been little incentive to develop processes for the manufacture of highly monomeric alkoxymethyl melamine products. Cameron et al. in U.S. Pat. No. 4,837,278 report the use of a "low imino, fully alkylated aminoplast crosslinking agent". A commercial aminoplast resin is used in this patent, referred to as ®Resimene RF 4518 which, according to an analysis reported in US 2002/0 000 536 A1, is a mixed alkoxymethyl melamine comprising methoxy methyl and 2-ethylhexoxy methyl groups, typically comprising about 5 alkoxymethyl groups bound to one molecule of melamine, with a mass fraction of imino groups, >NH, of about 0.28%, and a mass fraction of monomers of about 30%.

An object of this invention is to provide improved alkoxymethyl melamine compositions for use as low temperature crosslinkers in the production of flexible and tough coating films.

Another object is to provide improved low temperature curing alkoxymethyl melamine compositions which provide coatings with improved solvent resistance. A still further object is to improve the cold storage stability of highly methylated liquid melamine-formaldehyde crosslinker resins as these tend to solidify or form solid deposit at prolonged storage at low temperatures. A still further object is to provide a basis to tailor the crosslinking efficiency according to the intended application.

These and other objects of the invention as will be apparent from the following detailed description and examples are achieved by providing mixtures of monomeric and oligomeric alkoxymethyl melamine compounds with high alkyl substitution and low imino content.

SUMMARY OF THE INVENTION

This invention provides aminoplast crosslinker resin compositions comprising reaction products A made by reaction of melamine, formaldehyde, and alkanols which reaction products A are alkoxymethyl melamine derivatives comprising a mass fraction of from 35% up to 55% of monomeric alkoxymethyl melamine, with a ratio of the amount of substance of combined formaldehyde to the amount of substance of melamine, of at least 5.5 mol/mol, and not more than 5.75 mol/mol, and a ratio of the amount of substance of ether groups RO—, to the amount of substance of melamine, of at least 5.0 mol/mol. Preferably, the ratio of the amount of substance n(>NH) of imino groups >NH to the amount of substance of triazine n($C_3N_3$) in the crosslinker resin is not more than 0.21% (0.21 cmol/mol). R is an alkyl group which may be linear or branched, and has up to eight carbon atoms A monomeric alkoxymethyl melamine, also referred to herein as "monomer", has exactly one melamine-derived moiety in its molecule, in other words, in these molecules there are no bridging groups present as defined supra.

This invention further provides aminoplast crosslinker resin compositions comprising mixtures of the reaction product A mentioned supra and further crosslinkers B based on at least partially alkylated melamine-formaldehyde resins having a mass fraction of from more than 55% up to 95% of monomeric alkoxymethyl melamine, with a ratio of the amount of substance of combined formaldehyde to the amount of substance of melamine, of more than 5.75 mol/mol, and not more than 6.5 mol/mol, and a ratio of the amount of substance of ether groups R—O—, to the amount of substance of melamine, of from 4.5 mol/mol to 5.9 mol/mol, and a residual mass fraction of free formaldehyde in the crosslinker B, $m(CH_2O_{free})/m(B)$, where $m(CH_2O_{free})$ is the mass of free formaldehyde, and m(B) is the mass of the crosslinker B, of not more than 0.25%, or 0.25 cg/g. In these mixtures, the ratio of the mass m(A) of the reaction product A to sum of the masses of A and B, m(A)+m(B), is from 99% to 30%, preferably, from 98% to 40%, and particularly preferably, from 97% to 50%.

This invention also provides a process for the preparation of the reaction products A which comprises in the first step, synthesis of an alkylated methylolated melamine by reacting melamine, formaldehyde, and an aliphatic alcohol, preferably methanol, in a molar ratio of n(Mel):n($CH_2O$):n(R—OH) of 1 mol:at least 6.5 mol:(4 to 12) mol, where "Mel" stands for melamine, "$CH_2O$" stands for formaldehyde, and "R—OH" stands for a linear or branched aliphatic alcohol R—OH with an alkyl residue R having from one carbon atom, or three carbon atoms for a branched chain aliphatic alcohol, to eight carbon atoms. In the second step, this alkylated methylolated melamine is treated with further alcohol R—OH in the presence of an acid catalyst at a temperature of from 35° C. to 90° C. In this treatment, oligomerisation occurs to an extent depending on the kind of alcohol, the temperature, and the amount of acid catalyst. The reaction is stopped when the desired degree of oligomerisation has been reached, by cooling, and preferably, addition of a basic substance. It is also possible to use different alcohols in the first and second steps. It is further also possible to conduct the second step more than one time, i. e. two times or three times in succession, to increase the oligomer content while preserving a viscosity in a reasonable range. When reference is made, in this specification, to the reaction product A, the product of this reaction is meant, which may still comprise residual amounts of the educts (starting materials, such as non-converted melamine, non-converted formaldehyde, and non-converted alkanol R—OH) as is usual in chemistry.

To make an alkylated melamine formaldehyde crosslinker resins B, no such second step is required. Alkylated melamine formaldehyde crosslinker resins B are also provided commercially.

The invention relates further to coating compositions, which can be either solvent-borne or water-borne coating compositions, comprising a hydroxy-functional polymer which is preferably an acrylic copolymer or an alkyd resin, or an acryl-alkyd hybrid, in the form of a solution in a non-aqueous solvent, or as a dispersion in water or a mixture of water and a water-miscible solvent, and the melamine-formaldehyde based aminoplast crosslinker resin compositions as described supra, comprising the reaction product A, which coating compositions can be cured at temperatures of from 20° C. to 100° C., preferably from 25° C. to 80° C.

The invention still further relates to coating compositions, which can be either solvent-borne or water-borne coating compositions, comprising a hydroxy-functional polymer which is preferably an acrylic copolymer or an alkyd resin, or an acryl-alkyd hybrid, in the form of a solution in a non-aqueous solvent, or as a dispersion in water or a mixture of water and a water-miscible solvent, and aminoplast crosslinker resin compositions comprising mixtures of the reaction product A mentioned supra and further crosslinkers B based on at least partially alkylated melamine-formaldehyde resins having a mass fraction of from more than 55% up to 95% of monomeric alkoxymethyl melamine, with a ratio of the amount of substance of combined formaldehyde to the amount of substance of melamine, of more than 5.75 mol/mol, and not more than 6.5 mol/mol, and a ratio of the amount of substance of ether groups R—O—, to the amount of substance of melamine, of from 4.5 mol/mol to 5.9 mol/mol, and a residual mass fraction of free formaldehyde in the crosslinker B, $m(CH_2O_{free})/m(B)$, where $m(CH_2O_{free})$ is the mass of free formaldehyde, and m(B) is the mass of the crosslinker B, of not more than 0.25%, or 0.25 cg/g. In these mixtures, the ratio of the mass m(A) of the reaction product A to sum of the masses of A and B, m(A)+m(B), is from 99% to 30%, preferably, from 98% to 40%, and particularly preferably, from 97% to 50%.

DETAILED DESCRIPTION OF THE PREFERRED EMBODIMENTS

The reaction products A are characterised by the following parameters:
the ratio of the amount of substance n($CH_2O$) of combined formaldehyde to the amount of substance n(Mel) of melamine is in the range of from 5.55 mol/mol to 6.2 mol/mol, and preferably from 5.60 mol/mol to 6.1 mol/mol, and
the ratio of the amount of substance n(RO) of alkyl ether groups in the crosslinker resin to the amount of substance n(Mel) of melamine is in the range of from 5.0 mol/mol to 5.6 mol/mol, and preferably, from 5.05 mol/mol to 5.5 mol/mol, and
the mass fraction of monomer in the crosslinker resin, calculated as the ratio of the mass of monomer m(A1) to the mass m(A) of the reaction products A (excluding, of course, solvents, additives, catalysts, etc. which may later be added to prepare formulations of aminoplast crosslinker resin compositions comprising the reaction products A), is between 35% and 55%, preferably between 37% and 53%, and particularly preferably between 40% and 50%.

"Monomer" means in the context of this invention, a reaction product made from melamine, formaldehyde, and an alcohol R—OH that comprises only one moiety derived from melamine in its molecule. The monomer A1 which is present in the mixture of reaction products A therefore has only one moiety derived from melamine in its molecule, and at least a part of its aminic nitrogen groups (those that do not form the cyclic structure of the melamine molecule) has at least one substituent which is a methylol group (—$CH_2$—OH) or methyloloxymethyl group (—$CH_2$—(O—$CH_2$)$_n$—OH), where n is a natural number of at least 1, or an alkyoxymethyl group (—$CH_2$—O—R) or an alkoxymethyoxymethyl group (—$CH_2$—(O—$CH_2$)$_m$—OR) where m is a natural number of at least 1.

The ratio of the amount of substance n(>NH) of imino groups >NH in the reaction products A to the amount of substance n($C_3N_3$) of triazine in the reaction products A is preferably not more than 0.21%, and preferably, up to 0.20 cmol/mol. Triazine is the abbreviation used herein for a molecule of melamine where the three amino groups have been removed. Particularly preferred are reaction products A having a ratio of n(>NH) to n($C_3N_3$) in the crosslinker resin composition of not more than 0.16 cmol/mol.

In a preferred embodiment, the mass fraction of free formaldehyde in the reaction products A, calculated as the ratio of the mass $m_{fFA}$ of free formaldehyde to the mass of reaction products A m(A) of the reaction products A (excluding, of course, solvents, additives, catalysts, etc. which may later be added to prepare formulations of aminoplast crosslinker resin compositions comprising the reaction products A) is less than, or equal to, 0.2%, and more preferably, not more than 0.1%.

In a further preferred embodiment, the difference between the ratio n($CH_2O$)/n(Mel) of the amount of substance n($CH_2O$) of combined formaldehyde to the amount of substance n(Mel) of melamine, and the ratio n(RO)/n(Mel) of the amount of substance n(RO) of alkyl ether groups in the reaction products A to the amount of substance n(Mel) of melamine is at least 0.5 mol/mol, and further preferably, not more than 0.8 mol/mol.

In a further preferred embodiment, the mass fraction in the reaction products A of free methylol groups, —$CH_2$—OH, calculated as the ratio of the mass m($CH_2$—OH) to the mass m(A) of the reaction products A (excluding, of course, solvents, additives, catalysts, etc. which may later be added to prepare formulations of aminoplast crosslinker resin compositions comprising the reaction products A) is not more than 1.5%, and preferably, not more than 1.3%.

Combined formaldehyde, in the context of this invention, means any methylene group derived from formaldehyde directly or indirectly bound to an aminoplast former molecule, in this case, melamine, as an oligoacetal (>N—$CH_2$[O—$CH_2$]$_n$—O—H), (n+1 molecules of formaldehyde)
alkoxyoligoacetal (>N—$CH_2$-[O—$CH_2$]$_n$—OR), (n+1 molecules of formaldehyde)
alkoxymethyl (>N—$CH_2$—OR), (1 molecule of formaldehyde)
methylene ether bridge (>N—$CH_2$—O—$CH_2$—N<), (2 molecules of formaldehyde)
methylene bridge (>N—$CH_2$—N<), (1 molecule of formaldehyde) and
N-methylol group >N—$CH_2$OH (1 molecule of formaldehyde).

The content of combined formaldehyde is calculated from the measured contents of total and free formaldehyde, and analytical determination of the nitrogen content, and is expressed in the case of melamine-formaldehyde resins as the ratio of the amount of substance of methylene groups bound to oxygen or nitrogen atoms, n($CH_2$), to the amount of substance of melamine-derived moieties n(Mel), where Mel stands for a hexavalent moiety obtained by removing all aminic hydrogen atoms from a melamine molecule.

Reaction products similar to A can also be made from alkyl- and arylguanamines such as acetoguanamine, caprinoguanamine, and benzoguanamine for the purpose of this invention, with appropriate proportional reduction of the parameters to the number of amino groups in the aminoplast former which is only two for the guanamines mentioned, in contrast to melamine where the number of amino groups is three. Reaction products based on melamine are, however, preferred as crosslinker resins.

The further crosslinkers B based on melamine-formaldehyde resins have a mass fraction of from 55% up to 95%, preferably of from 56% up to 90%, and most preferred, from 57% up to 85%, of monomeric alkoxymethyl melamine, with a ratio of the amount of substance of combined formaldehyde to the amount of substance of melamine, of more than 5.75 mol/mol, and not more than 6.5 mol/mol, preferably, of from 5.77 mol/mol up to 6.3 mol/mol, and particularly preferred, from 5.78 mol/mol up to 6.1 mol/mol, and a ratio of the amount of substance of ether groups R'O—, to the amount of substance of melamine, of from 4.5 mol/mol to 5.9 mol/mol, preferably, of from 4.6 mol/mol up to 5.7 mol/mol, and particularly preferred, from 4.7 mol/mol up to 5.5 mol/mol, and a residual mass fraction of free formaldehyde of not more than 0.25%.

The alkyl residues R (in A) and R' (in B) may be the same or may be different, and individually have from one to eight carbon atoms, and may be linear or branched. Preferred alcohols or alkanols ROH and R'OH are methanol, ethanol, n- and iso-propanol, n- and iso-butanol, n-hexanol, and 2-ethylhexanol, accordingly the preferred alkyl residues R and R' are individually methyl, ethyl, n- and iso-propyl, n- and iso-butyl, n-hexyl, and 2-ethylhexyl.

The reaction products A can be used alone as crosslinkers, or they can be used in mixture with crosslinker resins B as described hereinabove. These mixtures can be made by simply admixing the crosslinker B which usually has a lower viscosity than the reaction products A, to these reaction products A under shear. It is preferred to add crosslinker B in small portions under stirring, and waiting until the mixture appears homogeneous before adding further portions of B. It is further preferred that this mixing process is conducted at ambient temperature (20° C. to 25° C.) or slightly elevated temperature, i. e. up to 50° C. It has been found that such mixtures retain their ability to cure at low temperatures, i. e. from ambient (20° C.) to about 100° C., as long at the mass fraction of reaction products A in the mixture with other crosslinker resins based on alkoxymethyl melamines does not drop below 30%, based on the mass of the mixture of the materials A and B, excluding as supra, solvents, catalysts, and other added components.

It has been found in the investigations which have led to the present invention that the crosslinker resin compositions according to the invention do not solidify or form solid deposit upon prolonged storage at low temperature, tests having been conducted for two weeks at a temperature of 6° C. In comparison, alkyl-etherified highly methylolated melamine formaldehyde resins having a mass fraction of monomer in excess of 60% are prone to form solid deposits upon cold storage under the conditions mentioned supra. Such alkyl-etherified highly methylolated melamine formaldehyde resins having a mass fraction of monomer below 35%, such as 30% or less, exhibit a high viscosity in undiluted form which impairs their usability as crosslinker resins. Addition of solvents or diluents to reduce the viscosity would, of course, increase the VOC (content of "volatile organic compounds") of the diluted crosslinker resins which is undesirable.

The crosslinker resin compositions according to the invention can be used in the preparation of coating compositions from hydroxy-functional polymers such as alkyd resins, polyester resins, acrylic resins, acrylic-alkyd hybrids or acrylic-polyester hybrids, polyether polymers, polyolefin polymers, or polyurethane polymers which may be selected from the group consisting of polyether-polyurethanes, polyester-polyurethanes, polycarbonate-polyurethanes, and polyolefin-polyurethanes, in the form of their solutions in organic solvents, and also, in the form of aqueous dispersions. It is preferred to use hydroxy-functional acrylic resins based on a hydroxy-functional olefinically unsaturated monomer selected from the group consisting of hydroxyalkyl acrylate and hydroxyalkylmethacrylate, and optionally, an olefinically unsaturated carboxylic acid, and also optionally, further olefinically unsaturated monomers. Particularly preferred are such hydroxy-functional resins that have primary hydroxyl groups, where it is especially preferred that a fraction of at least 50% of all hydroxyl groups present in the polymer are primary. The glass transition temperature of these hydroxy-functional polymers, measured in the usual way by differential scanning calorimetry in the second heating cycle, is preferably not more than 45° C. These hydroxy-functional polymers may be used in the form of a solution in an organic solvent or a mixture of two or more such solvents.

It has been found in the experiments underlying this invention that a combination of crosslinker resin compositions of the present invention with the hydroxy-functional binder polymers mentioned supra provides a satisfactory cure response already at temperatures ranging from ambient (20° C.) to 100° C., particularly at temperatures from 25° C. to 80° C., or from 30° C. to 70° C. The method of use of the aminoplast crosslinker compositions of alkoxymethyl melamine derivatives of the present invention comprises therefore
  providing a hydroxyfunctional polymer in the form of a solution or of an aqueous dispersion,
  adding thereto an aminoplast crosslinker resin as claimed in claim 1, under mixing, and
  coating a substrate with this coating composition to prepare a coating film on the substrate, and
  curing the coating film by applying heat,
wherein the curing temperature is between 20° C. and 100° C. While it is, of course, possible to use higher curing temperatures, thereby increasing the crosslinking speed, it is of particular advantage to restrict the curing temperature to a maximum value of 100° C. as this allows to use the crosslinker composition according to the present invention for use with temperature-sensitive substrates, particularly wood, fabricated or industrial wood, paper, cardboard, textiles, and leather, as well as plastics, particularly thermoplastic materials which do not have an elevated heat distortion temperature.

The preparation of coating compositions usually comprises the steps of charging a hydroxyfunctional polymer in the form of a solution or of an aqueous dispersion, and admixing thereto the reaction products A, hereinafter also referred to as "crosslinker A", or a mixture of the crosslinker A and the crosslinker B, or at first, the crosslinker A and then the crosslinker B, or at first the crosslinker B and then the crosslinker A, and optionally, before, during or after addition of the crosslinkers, admixing further additives, or pigments or both.

A preferred range for the ratio between the amount of substance of alkoxymethyl groups in the crosslinker resin composition to the amount of substance of hydroxyl groups in the hydroxy-functional binder resin is from 1.2 mol/mol to 2.5 mol/mol.

It has further been found in the experiments underlying this invention that a combination of crosslinker resin compositions of the present invention with hydroxy-functional acrylic resins exhibits a particularly fast curing response, as shown by development of hardness over time, if there is a sufficient amount of primary hydroxyl groups in the acrylic resin, which primary hydroxyl groups stem from copolymerised hydroxyalkyl (meth)acrylates, which term includes individually hydroxyalkyl methacrylates and hydroxyalkyl acrylates, particularly hydroxyethyl, 3-hydroxypropyl, 4-hydroxybutyl, and 6-hydroxyhexyl(meth)acrylates, and also (meth)acrylates of oligomeric and polymeric ethylene oxide. These hydroxy-functional acrylic copolymers may also comprise moieties derived from further olefinically unsaturated monomers such as olefinically unsaturated carboxylic acids, and further olefinically unsaturated monomers like linear, branched or cyclic alkyl esters of olefinically unsaturated carboxylic acids, vinylaromatics such as styrene, and vinyl esters of alkanoic acids which may be linear or branched. The hydroxyl number stemming from primary hydroxyl groups is preferably from 30 mg/g to 200 mg/g, and particularly preferably, from 50 mg/g to 150 mg/g. Hydroxy-functional acrylic copolymers having a glass transition temperature of not more than 45° C., and particularly, those having a glass transition temperature of not more than 40° C., are preferred in the context of this invention.

Highly etherified aminoplast crosslinkers cannot usually be used in combination with water-borne hydroxyfunctional resins to make a coating composition, as the strong acid used as catalyst for the crosslinker interferes with self-emulsified hydroxy-functional binder resins which are acid-stabilised and made water-dispersible by neutralisation thereof with amines.

A preferred process of making coating compositions using the crosslinker resin compositions of the present invention together with hydroxyfunctional polymers comprises the steps of charging a hydroxyfunctional polymer in the form of a solution or of an aqueous dispersion, and admixing thereto the reaction products A, or a mixture of the reaction products A and the crosslinker B, or at first, the reaction products A and then the crosslinker B, or at first the crosslinker B and then the reaction products A, and optionally, before, during or after addition of the crosslinkers, admixing further additives, or pigments or both.

It has further been found in the course of the experiments leading to the instant invention that an acrylic copolymer emulsion having a high amount of hydrophilic monomer, such as hydroxyethyl acrylate or hydroxyethylmethacrylate, and a usual amount of olefinically unsaturated carboxylic acid to make the copolymer water-dispersible, is stable as aqueous dispersion without neutralisation.

These aqueous, hydroxy-functional acrylate copolymer emulsions or dispersions can be cured with the aminoplast crosslinker resins according to this invention at temperatures as low as 70° C. Coating compositions based on the combination of binder resins and crosslinker resins as detailed supra can therefore be used to coat heat-sensitive substrates such as thermoplastic materials, paper, cardboard, wood, fabricated wood, industrial wood, textiles, and leather. It is also advantageous to use such coating compositions on mineral substrates and even metals, particularly on large objects which cannot easily be heated in an oven to accelerate the curing speed.

Useful coating compositions can also be formulated from alkyd resin solutions or dispersions, and particularly preferred, from acrylic-modified alkyd resins also referred to as acryl-alkyd hybrid resins which may be used for temperature-sensitive substrates such as wood, industrial or fabricated wood, thermoplastic materials, paper and cardboard.

The invention is further explained in the examples infra which are not intended to be limiting.

The following physicochemical properties are used in the examples, and in the specification text:

The hydroxyl number $w_{OH}$ is defined according to DIN EN ISO 4629 (DIN 53 240) as the ratio of the mass of potassium hydroxide $m_{KOH}$ having the same number of hydroxyl groups as the sample under examination, and the mass $m_B$ of that sample (mass of solids in the sample for solutions or dispersions); the customary unit is "mg/g".

The acid number $w_{Ac}$ is defined, according to DIN EN ISO 3682 (DIN 53 402), as the ratio of that mass $m_{KOH}$ of potassium hydroxide which is needed to neutralise the sample under examination, and the mass $m_B$ of this sample, or the mass of the solids in the sample in the case of a solution or dispersion; its customary unit is "mg/g".

The molar mass $M_B$ of a chemical compound B is the ratio of the mass $m_B$ of the chemical compound B under examination, and the amount of substance $n_B$ of the chemical compound B under examination; its SI base unit is "kg/mol". In a polymer which is normally a mixture of molecules having the same chemical composition, but differing in their degree of polymerisation, the number average molar mass is defined as $$M_n = \frac{1}{N}\sum_{j=1}^{k} v_j \times M_j,$$

where $v_j$ is the number of polymer molecules having the molar mass $M_v$ for all k molecules having different molar masses, and N is the total number of all polymer molecules in the sample; the mass average molar mass, also referred to as "weight average molar mass", is defined as $$M_w = \frac{1}{m}\sum_{j=1}^{k} m_j \times M_j,$$

where $m_j$ is the mass of polymer molecules having the molar mass $M_j$, for all k molecules having different molar masses, and m is the total mass (=sum of the masses) of all polymer molecules in the sample. These molar mass averages can conveniently be determined by size-exclusion (or gel permeation) chromatography, with calibration against polystyrene standards. Molar mass measurements were conducted using crosslinker resin samples (0.5 g) dissolved in tetrahydrofuran (20 ml), elution speed was 1 ml/min.

The mass fraction of solids $w_s$ in a solution or dispersion is defined as the ratio of the mass of solids $m_s$ in a sample B, and the mass $m_B$ of the sample, which in this case is the sum of the mass of solids $m_s$, and the mass $m_v$ of the solvent or dispersant V.

The dynamic viscosity is measured according to DIN EN ISO 3219 at 23° C., and a shear rate of 100 s$^{-1}$.

Glass transition temperatures are conveniently measured by differential scanning calorimetry, and recording the temperature at the inflection point(s) during the second heating cycle.

The mass fraction of solids $w_s$ for melamine-based crosslinker resins ("foil solids") is determined by measuring the loss of mass $\Delta m$ of a sample B having a mass $m_B$ of approximately 1 g which is spread by folding the foil over on itself, thereby compressing the sample to provide a thin film having a diameter of from 4 cm to 7 cm. The foil is the opened up, and placed in a circulating air oven at 45° C. for forty-five minutes, at the end of which time it is removed, and reweighed to determine the loss of mass, as $w_s=(m_B-\Delta m)/m_B$.

The amount-of-substance fraction $x_i$ (also referred to as "mole fraction") of a chemical compound i in a mixture comprising m individual chemical compounds j, or of a moiety i in a chemical compound comprising m different moieties j, where j is natural number from 1 to m, is defined as $$x_i = n_i \bigg/ \sum_{j=1}^{m} n_j,$$

where $n_j$ is the amount of substance of chemical compound or moiety j, having the SI base unit "mol". Similarly, in a melamine formaldehyde resin, characteristic quantities are the ratio of the amount of substance $n(CH_2)$ of combined formaldehyde, present as —$CH_2$— groups, as N-methylol functional groups >N—$CH_2$—OH or in acetal groups —O—$CH_2$—O— or an alkoxymethyl ether groups R—O—$CH_2$—, or in methylene groups >N—$CH_2$—N<, to the amount of substance n(Mel) of melamine derived moieties, $C_3N_3(N<)_3$, or the ratio of the amount of substance of alkyl ether or alkoxy groups, n(RO), to the amount of substance n(Mel) of melamine derived moieties, $C_3N_3(N<)_3$. These can be determined by $^{13}$C-NMR spectroscopy, and by titration (free formaldehyde), respectively.

Strength is the mass fraction $w_s$ of solute S in a solution L, measured as mass $m_s$ of solute divided my mass $m_L$ of solution, usually stated in "%" {1%=1 kg/(100 kg)=1 cg/g}.

The imino group content measured in "%" or "cmol/mol" by IR spectroscopy, is the ratio of the amount of substance n(NH) of imino groups (>N—H), and the amount of substance $n(C_3N_3)$ of triazine in the crosslinker resin.

EXAMPLES

Example 1

Synthesis of a Crosslinker Resin
(Reaction Product A)

1.1 Preparation of HMMM

A mixture was prepared from 126 g of melamine, 545 g of a mixture containing mass fractions of 55% of formaldehyde, 35% of methanol, and 10% of water, and 5 g of an aqueous sodium hydroxide solution having a mass fraction of sodium hydroxide of 10%, charged into a reaction vessel equipped with a stirrer and a reflux condenser, heated under stirring to 83° C. whereupon gentle reflux set in. The solution became clear and homogeneous. After heating to 87° C., the mixture became cloudy after fifteen minutes. 500 g of methanol were added, and heating under reflux was continued for ten more minutes. After cooling to ambient temperature (23° C.), the precipitate was collected by filtration, yielding 235 g of a solid material which was, according to the analysis, hexamethylol melamine ("HMM"). The solid HMM was transferred to another reaction vessel, 950 g of methanol and 50 g of nitric acid were added. The reaction mixture was stirred at ambient temperature for fifteen minutes, and finally neutralised by adding 150 g of powdered sodium hydrogencarbonate and 20 g of sodium carbonate. Methanol was removed by distillation under reduced pressure. Xylene was added, and the resulting suspension was filtered, the solid residue was isolated, washed with further xylene, and dried. 202 g of hexamethoxymethyl melamine ("HMMM") were obtained.

1.2 Oligomerisation of HMMM

Hexamethoxymethyl melamine (100 g) and methanol (6.2 g) were mixed. To this mixture, concentrated nitric acid was added in small portions to adjust the pH to 1.5. Reaction temperature was raised under stirring to 65° C. and the reaction mixture was held at these conditions for two hours. The progress of the reaction was then monitored with gel permeation chromatography until after two hours, the mass fraction of monomers was less than 50%. The mixture was then cooled to 40° C., and pH of the mixture was adjusted to 9 by addition of 25% strength aqueous sodium hydroxide solution. The volatile components (mainly methanol and water) were then stripped off under reduced pressure 15 hPa and heating up to 105° C. which temperature and pressure were then held for twenty minutes. The precipitate was then removed by filtration. The yield of oligomerised resin was 92 g with the following characteristics:

mass fraction of free formaldehyde: 0.08%;
imino groups content: 0.16%,
molar mass (number-average): 540 g/mol;
molar mass (mass average): 945 g/mol;
$n(CH_2)/n(Mel)$=5.81 mol/mol;
$n(OR)/n(Mel)$=5.23 mol/mol.

In this case, R stands for the methyl group.

1.3 Cold Storage Test of the Oligomerised Resin (Reaction Product A) in Comparison to Commercial Liquid HMMM Type Resin Having a Low Degree of Polymerisation Samples of the oligomerised resin of this example and of a commercial fully alkylated highly monomeric melamine-formaldehyde resin were stored at 6° C. for an extended period of time. The results are summarised in Table 1:

TABLE 1

| Cold Storage Stability | | | |
|---|---|---|---|
| Crosslinker Resin | Degree of Polymerisation[+] | 6° C.; eight days | 6° C.; fifty days |
| of Example 1 | 1.38 | clear liquid | clear liquid |
| Commercial Resin* | 1.10 | small crystallised clouds | partially crystallised |

*Commercial Resin is a hexa(methyoxymethyl/butoxymethyl)-melamine resin (ratio of methoxy to butoxy groups is 90:10) having a GPC average degree of polymerisation of 1.10.

[+]The GPC average degree of polymerisation $D_{GPC}$ reported here commonly relates to the mass $D_m$ and number $D_n$ averages as $D_{GPC}=\sqrt{D_n \times D_m}$ Example 2

Aqueous Coating Composition 2.1 Acrylic Emulsion Copolymer

An acrylic emulsion with a monomer composition as shown in Table 2a was produced by a usual emulsion polymerisation. The obtained acrylic emulsion was milk white water emulsion, with a mass fraction of solids of 42.5% and a pH=2.9.

TABLE 2a

| Components | mass in g |
|---|---|
| styrene | 80 |
| methyl methacrylate | 170 |
| butyl acrylate | 340 |
| hydroxyethyl methacrylate | 340 |
| methacrylic acid | 36 |

2.2 Coating Composition and Test

This acrylic emulsion was mixed with the resin of Example 1.2 and a catalyst according to the following recipe:

TABLE 2b

| Components | mass in g |
|---|---|
| Acrylic emulsion of example 2.1 | 153 |
| Crosslinker Resin of Example 1.2 | 35 |
| Cycat ® 600 | 5 |

Cycat® 600 is a solution of dodecyl benzene sulphonic acid in a mixture of isopropanol and diethylene glycol mono butyl ether with a mass fraction of 70% of dodecyl benzene sulphonic acid (Cytec Industries Inc.).

This mixture was coated onto a steel panel using a bar coater to provide dry film thickness of 30 μm. The wet film was set in ambient condition (23° C., 50% relative humidity) for five minutes, baked at 70° C., 80° C., 90° C. and 100° C. for twenty minutes in a gradient oven, and finally set in the ambient condition for one day. A portion of the baked film coated onto the steel panel was tested for solvent resistance by rubbing with methyl ethyl ketone (MEK) until the coating softens following the procedure of ASTM D-5402-93 "Standard Practice for Assessing the Solvent Resistance of Organic Coatings Using Solvent Rubs"; one MEK rub is a back and forth cycle. The result is in Table 3. The film baked at 70° C. failed at 170 MEK double rubs. Another portion of the baked film was tested for hardness following the procedure of ASTM D 1474-98 "Standard Test Methods for Indentation Hardness of Organic Coatings" also known as "Knoop Hardness". The test results are listed in Table 3. The film baked at 70° C. exhibited a Knoop Hardness of 16.7.

TABLE 3

| Baking temperature | MEK rubs | Knoop Hardness |
|---|---|---|
| 70° C. | 170 | 16.7 |
| 80° C. | >200 | 27.4 |
| 90° C. | >200 | 33.7 |
| 100° C. | >200 | 29.4 |

It can be seen that the crosslinker resin composition performs well even at low curing temperatures which had not been possible with amino crosslinker resins of the state of the art.

Example 3

Solvent-Borne Coating Compositions Based on Acrylic Resins

The following hydroxy-functional acrylic copolymer resins dissolved in organic solvents were used:

A1 copolymer solution in methyl amyl ketone made by copolymerisation of methyl methacrylate, 4-hydroxybutyl acrylate, styrene, butyl acrylate and acrylic acid having a hydroxyl number of 146 mg/g, an acid number of 11.4 mg/g, a number average molar mass $M_n$ of 2505 g/mol, a glass transition temperature of 18° C., and a mass fraction of solids of 75%, wherein all hydroxyl groups are primary hydroxyl groups, A2 copolymer solution in xylene made by copolymerisation of styrene, methyl methacrylate, hydroxyethyl methacrylate, 2-ethylhexyl acrylate, and acrylic acid having a hydroxyl number of 65 mg/g, an acid number of 4 mg/g, a glass transition temperature of 68° C., and a mass fraction of solids of 50%

A3 copolymer solution in xylene made by copolymerisation of methyl methacrylate, hydroxyethylmethacrylate, styrene and acrylic acid in the presence of glycidyl neodecanoate according to example 1 of DE 26 26 900 C2, having a mass fraction of hydroxyl groups of 4.5%, corresponding to a hydroxyl number of 148.5 mg/g, wherein 53% of these, corresponding to a hydroxyl number of 79.5 mg/g, are primary, an acid number of 7.5 mg/g, a glass transition temperature of 38° C., and a mass fraction of solids of 50%, A4 copolymer solution in butyl acetate made by copolymerisation of methyl methacrylate, butyl methacrylate, 2-ethylhexyl acrylate, hydroxyethyl methacrylate, and acrylic acid, having a hydroxyl number of 80 mg/g, all of which are primary hydroxyl groups, an acid number of 12 mg/g, a glass transition temperature of 18° C., and a mass fraction of solids of 60%.

Clear coating compositions 3.1 through 3.3 were prepared from these copolymer solutions by adding the crosslinker of example 1.2, a solvent mixture (a), a slip and levelling additive (b), and a catalyst (c; ®Cycat 600, v. s.) diluted with ethanol as diluent (d), where the following amounts were used:

TABLE 4

Paint Compositions

| Paint No. | Acrylic copolymer solution, kind \| $m_P$ in g | Crosslinker solution $m_X$ in g | Solvent[a] $m_S$ in g | Additive[b] $m_A$ in g | Diluent[d] $m_D$ in g | Catalyst[c] $m_C$ in g |
|---|---|---|---|---|---|---|
| 3.1 | A1 \| 44.84 | 13.38 | 32.80 | 0.24 | 7.42 | 1.32 |
| 3.2 | A2 \| 80.69 | 7.12 | 3.22 | 0.24 | 7.42 | 1.32 |
| 3.3 | A3 \| 56.64 | 13.48 | 20.91 | 0.24 | 7.42 | 1.32 |
| 3.4 | A4 \| 51.19 | 7.11 | 30.30* | 0.20 | 6.06 | 1.12 |
| 3.5 | A4 \| 51.19 | 7.11[§] | 30.30* | 0.20 | 6.06 | 1.12 |

[a]solvent mixture of equal masses of technical xylene and 1-methoxy-2-propyl acetate (CAS-No. 108-65-6)
[b]dimethyl, methyl (polyethylene oxide acetate-capped) siloxane, CAS number 70914-12-4, (Dow Corning ® 57 Additive, Midland, MI), diluted to a strength of 10% with the solvent mixture a supra
[c]solution of para-toluene sulphonic acid ("PTSA") in ethanol, mass fraction of PTSA in the solution: 10%
[d]ethanol These paint compositions were applied to 101.6 mm×304.8 mm (4"×12") phosphated steel panels in a dry film thickness of from 40 μm to 45 μm, and dried at ambient temperature (23° C.). The characteristic data are summarised in table 5a.

TABLE 5a

| Paint No. | 3.1 | 3.2 | 3.3 |
|---|---|---|---|
| König Pendulum Hardness, after 1 d | 43 s | 120 s | 58 s |
| König Pendulum Hardness, after 7 d | 93 s | 187 s | 130 s |
| Pencil Hardness, after 1 d | 2B . . . B | B . . . HB | 2B . . . B |
| Pencil Hardness, after 7 d | F . . . H | F . . . H | F - - - H |
| MEK double rubs, after 1 d[§] | 200 (150) | >200 (30) | >200 |
| Chemical Resistance Tests[+] on coated panels cured for seven days at ambient, Test Fluids: | | | |
| Gasoline | no effect | slight softening | softening |
| Diesel Fuel | no effect | no effect | no effect |
| Windex Household Cleaner | no effect | no effect | slight softening |
| Ethanol/Water, 50% strength | no effect | no effect | no effect |
| Aqueous Sulphuric Acid (c = 0.1 mol/L) | no effect | no effect | no effect |
| Aqueous Sodium Hydroxide, $w_{NaOH}$ = 10% | no effect | no effect | no effect |
| Skydrol 500 B-4 # | no effect | no effect | no effect |
| Cleveland Humidity Resistance Test after Storage for eleven days at 40° C.* | | | |
| 60° gloss, initial | 94 | 98 | 95 |
| 60 gloss, after 11 d | 93 | 98 | 92 |
| Number of Blisters on the Test Panel, after 11 d | 10 | 10 | 10 | relevant ASTM standards are used in the tests if not designated differently
[+]one drop of test liquid is positioned on the coating film which as been cured for seven days, and covered with a watch glass for one hour, after which the remaining liquid is wiped off, and the coating film is tested after 7 d rest at ambient
[§]number of double rubs when the first mar is observed in the coating film
®Skydrol 500 B-4 is an aromatic phosphate ester hydraulic fluid manufactured by Solutia Inc. and is a mixture of mass fractions of approximately 20% of tributyl phosphate, 55% of dibutyl phenyl phosphate, and 25% of butyl diphenyl phosphate
*Gloss measured after 7 d rest at ambient (23° C. and 50% relative humidity)
" . . . " means: the measured value lies between the two values stated Comparative coating compositions 3.4 and 3.5 were prepared from the acrylic resin A4 using the crosslinker of example 1.2 (coating composition 3.4) and a commercial melamine-formaldehyde crosslinker resin (coating composition 3.5; crosslinker is ®Cymel 303 LF, Cytec Industries Inc., having a mass fraction of solids of 98%, and a mass fraction of monomers of 60%, and a ratio of amount of substance of melamine to combined formaldehyde to methoxy groups of 1 mol:5.8 mol:5.0 mol), using the recipes of Table 4. These paint compositions were applied to 101.6 mm×304.8 mm (4"×12") phosphated steel panels in a dry film thickness of from 40 μm to 45 μm. Curing conditions and characteristic data are summarised in table 5b.

TABLE 5b

| | Paint No. | | | |
|---|---|---|---|---|
| | 3.4 | 3.5 | 3.4 | 3.5 |
| Curing conditions | 60° C.; 30 min | | 80° C.; 30 min | |
| König Pendulum Hardness, after 2 h | 85 s | 49 s | 140 s | 145 s |
| König Pendulum Hardness, after 1 d | 109 s | 65 s | 147 s | 153 s |
| König Pendulum Hardness, after 7 d | 147 s | 115 s | 160 s | 161 s |
| Tukon Hardness, after 2 h | 3.7 | 1.3 | 7.6 | 7.4 |
| Tukon Hardness, after 1 d | 5.3 | 2.1 | 8.2 | 8.1 |
| Tukon Hardness, after 7 d | 7.4 | 4.9 | 9.1 | 9.2 |
| Pencil Hardness, after 2 h | B . . . HB | 2B . . . B | F . . . H | F . . . H |
| Pencil Hardness, after 1 d | HB . . . F | 2B . . . B | F . . . H | F . . . H |
| Pencil Hardness, after 7 d | F . . . H | B . . . HB | H . . . 2H | H . . . 2H |
| MEK double rubs, after 2 h$^§$ | >200 | 100 | >200 | >200 |
| MEK double rubs, after 1 d | >200 | 150 | >200 | >200 |
| Chemical Resistance Tests[+], Test Fluids: | | | | |
| Aqueous Sulphuric Acid, $w_s$ = 50% | no effect | no effect | no effect | no effect |
| Gasoline | no effect | no effect | no effect | no effect |
| Diesel Fuel | no effect | no effect | no effect | no effect |
| Windex Household Cleaner | no effect | no effect | no effect | no effect |
| Ethanol/Water, 50% strength | no effect | no effect | no effect | no effect |
| Aqueous Sodium Hydroxide, $w_{NaOH}$ = 10% | no effect | no effect | no effect | no effect |
| Skydrol 500 B-4 # | no effect | no effect | no effect | no effect |

It can be seen that the crosslinker according to the present invention already provides fast curing at low temperatures (60° C.), while at least 80° C. is needed for commercial melamine-formaldehyde crosslinkers to exhibit the needed crosslinking leading to the desired mechanical and chemical resistance data.

The difference in curing speed can also be clearly shown by determination of the hydroxyl group content in the coating by infrared spectroscopy (O—H vibration line in the region of 3500 cm$^{-1}$) indicating crosslinking.

The following table lists the decrease on hydroxyl groups for acrylic resins A1 to A3 upon curing with the crosslinker of example 1.2:

TABLE 5c

Crosslinking Speed Measured by Relative Decrease $\Delta I/I_0$ of O—H IR Vibration Line Extinction, where $I_0$ is the initial OH extinction at t = 0 h, and ΔI is the change recorded at time t, normalised to the triazine extinction

| Acrylic Resin | t = 0 | t = 72 h | t = 168 h |
|---|---|---|---|
| A1 | 0% | 71.8% | 75.3% |
| A2 | 0% | 22.0% | 22.0% |
| A3 | 0% | 24.3% | 28.3% |

For acrylic resin A4 (having only primary hydroxyl groups, and a low glass transition temperature), the relative decrease of the O—H IR Vibration Line Extinction was about the same as for acrylic resin A1. It can be seen from these results that a high glass transition temperature of the acrylic resin (A2) impedes fast curing, comparing two resins A1 and A2 with only primary hydroxyl groups which are more reactive than secondary hydroxyl groups, and that a large share of secondary hydroxyl groups (A3) results in slow curing even in a resin of low glass transition temperature, compared to resins A1 and A4 with primary hydroxyl groups and low glass transition temperature.

Example 4

Solvent-Borne Coating Compositions Based on Alkyd Resins

A commercial short oil alkyd resin based on coconut oil (Beckosol® 12-035 having a mass fraction of solids of 60%, dissolved in xylene, a hydroxyl number of 155 mg/g and an acid number of 12 mg/g) was used to formulate a clear coating composition, mixing in the order shown, 108.3 g of the short oil alkyd resin solution, 10 g of methoxypropyl acetate, 10 g of xylene, 25 g of a catalyst solution comprising a mass fraction of 10% of para-toluene sulphonic acid dissolved in ethanol, 1.0 g of a slip and levelling additive based on a silicon-modified polyether (Additive 57, Dow Corning Corp., Midland Mich.), and 35 g of a crosslinker (paint 4.1: crosslinker of example 1.2; paint 4.2: a commercial low temperature curing melamine formaldehyde resin having an amount-of-substance ratio of melamine to combined formaldehyde of 1 mol:5.8 mol, an amount-of-substance ratio of methoxy groups to methylene groups of combined formaldehyde of 0.85 mol/mol, and an amount-of-substance ratio of n-butoxy groups to methylene groups of combined formaldehyde of 0.10 mol/mol, and a mass fraction of monomers of 69.3%). The following test results were found for coated steel panels with a dry film thickness of 45 μm:

TABLE 6a

Ambient Temperature Curing (23° C.), Time in Hours

| Paint | 4.1 | 4.2 |
|---|---|---|
| Set to Touch Time | 0.25 | 0.4 |
| Tack Free Time | 0.4 | 0.5 |
| Dry Hard Time | 0.8 | 1.75 |
| Dry Through Time | 2.75 | 4.5 |

After baking at 60° C. for thirty minutes in an oven, film hardness was measured with a Koenig pendulum tester, according to the Knoop method, and the solvent resistance was assessed with the MEK double rub test. The following results were obtained:

TABLE 6b

Test Results

| | Koenig Hardness | Knoop Hardness | MEK double rubs |
|---|---|---|---|
| Paint 4.1 | 131 s | 5.7 | >200 |
| Paint 4.2 | 106 s | 4.3 | 195 |

It can be seen that the crosslinker according to the invention provides better low temperature curing properties (faster cure and better mechanical and chemical resistances).

Example 5

91 g of the resin of example 1.2 ("X1") were mixed with 9 g of a methylated melamine formaldehyde crosslinker resin ("CX-MFM") having ratios of amounts of substance of moieties derived from melamine, combined formaldehyde, and methanol of $n(CH_2)/n(Mel)=5.8$ mol/mol, and $n(RO)/n(Mel)=4.9$ mol/mol, a mass fraction of monomeric species of 59%, and a viscosity at 23° C. of 4.5 Pa·s, where R=Me ($-CH_3$).

This crosslinker mixture "X7" (mass fraction of solids 80%, solvent: xylene) was used in comparison with the crosslinker used as further constituent for the mixture ("CX-MFM"), and with a commercial low-temperature crosslinking highly monomeric methyl/butyl mixed ether melamine-formaldehyde crosslinker resin ("CX-MBFM", ®Resimene CE 7103, INEOS Melamines), in each case together with a short oil alkyd, according to the following recipe:

TABLE 7

Clear Coating Composition (mass of components in g)

| Component | Paint 7.1 | Paint 7.2 | Paint 7.3 |
|---|---|---|---|
| X7 | 35 | | |
| CX-MFM[a] | | 35 | |
| CX-MBFM[b] | | | 43.75 |
| short oil alkyd[d] | 108.33 | 108.33 | 108.33 |
| slip and levelling additive[e] | 1.0 | 1.0 | 1.0 |
| 2-methoxy-1-methylethyl acetate | 26.4 | 26.4 | 22.0 |
| xylene | 26.4 | 26.4 | 22.0 |
| 2-butoxy ethanol | 2.0 | 2.0 | 2.0 |
| catalyst solution[f] | 25.0 | 25.0 | 25.0 |

TABLE 7-continued

Clear Coating Composition (mass of components in g)

| Component | Paint 7.1 | Paint 7.2 | Paint 7.3 |
|---|---|---|---|
| ambient curing time[g] | 3 h | >6 h | >6 h |
| cold check test[h] | >5 | >5 | >5 |

[a]methylated melamine formaldehyde crosslinker resin ("CX-MFM") having ratios of amounts of substance of moieties derived from melamine, combined formaldehyde, and methanol of $n(CH_2)/n(Mel) = 5.8$ mol/mol, and $n(MeO)/n(Mel) = 4.9$ mol/mol, a mass fraction of monomeric species of 59%, and a viscosity at 23° C. of 4.5 Pa · s
[b]®Resimene CE 7103, mixed methylated (90%) and n-butylated (10%) melamine-formaldehyde crosslinker resin with a high mass fraction of monomeric species (degree of polymerisation as measured by GPC using polystyrene standards, of 1.1), and a viscosity at 23° C. of less than 1 Pa · s
[d] Beckosol ® 12-035 (Reichhold Inc, Research Triangle Park, NC), short oil non-drying alkyd resin based on coconut oil; solution in xylene with a mass fraction of solids of 60%.and an acid value of 12 mg/g
[e]dimethyl, methyl (polyethylene oxide acetate-capped) siloxane, CAS number 70914-12-4, undiluted (Dow Corning ® 57 Additive, Midland, MI)
[f]solution of para-toluene sulphonic acid ("PTSA") in ethanol, mass fraction of PTSA in the solution: 10%
[g]dry-through time after curing at 23° C. for the specified time, as measured in accordance with ISO 9117
[h]Cold check test, modified from ASTM D 1211, to assess the propensity of forming cracks by subjecting with a plurality of cycles of (i) subject to (49 ± 1) ° C. at a relative humidity of (50 ± 5) % for one hour, then (ii) subject to ambient (23° C.)for thirty minutes, (iii) subject to (−49 ± 1) ° C. for one hour, and finally (iv) store at ambient (23° C.) for at least 30 minutes, and count the number of subsequent cycles where no cracks are formed It can be seen that the mixture (X7) has an advantage over crosslinkers with higher mass fraction of monomeric species, both as pure methyl ether (CX-MFM) in paint 7.2, and as mixed ether (CX-MBFM) in paint 7.3, with regard to hardness development.

What is claimed is:

1. An aminoplast crosslinker resin composition comprising an at least partially alkylated reaction product A of melamine, formaldehyde, and alkanols R—OH with the following parameters:
   the ratio of the amount of substance $n(CH_2O)$ of combined formaldehyde to the amount of substance $n(Mel)$ of melamine is in the range of from 5.55 mol/mol to 6.2 mol/mol, and
   the ratio of the amount of substance $n(RO)$ of alkyl ether groups in the crosslinker resin to the amount of substance $n(Mel)$ of melamine is in the range of from 5.0 mol/mol to 5.6 mol/mol, and
   the mass fraction of monomer in the crosslinker resin, calculated as the ratio of the mass of monomer $m(A1)$ to the mass $m(A)$ of the oligomerization reaction products A is between 35% and 55%,
and where R is an alkyl group which may be linear or branched, and has up to eight carbon atoms.

2. The aminoplast crosslinker resin composition of claim 1 wherein in the reaction product A the ratio of the amount of substance $n(>NH)$ of imino groups >NH in the crosslinker resin to the amount of substance $n(C_3N_3)$ of triazine is not more than 0.21%.

3. The aminoplast crosslinker resin composition of claim 1 wherein in the reaction product A the difference between the ratio $n(CH_2O)/n(Mel)$ of the amount of substance $n(CH_2O)$ of combined formaldehyde to the amount of substance $n(Mel)$ of melamine, and the ratio $n(RO)/n(Mel)$ of the amount of substance $n(RO)$ of alkyl ether groups in reaction product A to the amount of substance $n(Mel)$ of melamine is at least 0.5 mol/mol.

4. The aminoplast crosslinker resin composition of claim 1 wherein in the reaction product A the mass fraction in the crosslinker resin of free methylol groups, $-CH_2-OH$, calculated as the ratio of the mass $m(CH_2-OH)$ to the mass $m(A)$ of reaction product A is not more than 1.5%.

5. The aminoplast crosslinker resin composition of claim 1 which comprises a further crosslinker B which is an at least partially alkylated melamine-formaldehyde resin having a mass fraction of from more than 55% up to 95% of monomeric alkoxymethyl melamine, with a ratio of the amount of substance of combined formaldehyde to the amount of substance of melamine, of more than 5.75 mol/mol, and not more than 6.5 mol/mol, and a ratio of the amount of substance of ether groups R'O—, to the amount of substance of melamine, of from 4.5 mol/mol to 5.9 mol/mol, and a residual mass fraction of free formaldehyde of not more than 0.25%, wherein in these mixtures, the ratio of the mass of A to sum of the masses of A and B is from 99% to 30%.

6. A process for the preparation of an aminoplast crosslinker resin composition comprising a reaction product A as claimed in claim 1 which comprises in the first step, synthesis of an alkylated methylolated melamine by reacting melamine, formaldehyde, and an aliphatic alcohol, preferably methanol, in an amount-of-substance ratio of n(Mel):n(CH$_2$O):n(R—OH) of 1 mol : at least 6.5 mol:(4 to 12) mol, where "Mel" stands for melamine, "CH$_2$O" stands for formaldehyde, and "R—OH" stands for a linear or branched aliphatic alcohol having one carbon atom to six carbon atoms, and in the second step, this alkylated methylolated melamine is treated with further alcohol R—OH in the presence of an acid catalyst at a temperature of from 35° C. to 90° C.

which after cooling yields the reaction product A.

7. A process for the preparation of an aminoplast crosslinker resin composition as claimed in claim 5 wherein the crosslinker mixture is prepared by admixing the crosslinker B to the reaction products A under shear.

8. A method of use of the aminoplast crosslinker resin compositions as claimed in claim 1 which comprises providing a hydroxyfunctional polymer in the form of a solution or of an aqueous dispersion,
adding thereto an aminoplast crosslinker resin composition as claimed in claim 1, under mixing, and
coating a substrate with this coating composition to prepare a coating film on the substrate, and
curing the coating film by applying heat,
wherein the curing temperature is between 20° C. and 100° C.

9. The method of use of claim 8 wherein the hydroxyfunctional polymer is based on a hydroxy-functional olefinically unsaturated monomer selected from the group consisting of hydroxyalkyl acrylate and hydroxyalkylmethacrylate, and optionally, an olefinically unsaturated carboxylic acid, and optionally, further olefinically unsaturated monomers.

10. The method of use of claim 8 wherein the hydroxyfunctional polymer is an alkyd resin.

11. The method of use of claim 8 wherein the hydroxyfunctional polymer has primary hydroxyl groups.

12. The method of claim 8 wherein the hydroxy-functional polymer has a glass transition temperature of not more than 45° C.

13. The method of claim 8 wherein the substrate is a metal or a mineral substrate or a heat-sensitive substrate selected from the group consisting of thermoplastic materials, paper, cardboard, wood, industrial wood, fabricated wood, textiles, and leather.

14. Coating compositions comprising the aminoplast crosslinker resin composition of claim 1 and a hydroxyfunctional polymer in the form of a solution or of an aqueous dispersion.

15. The coating compositions of claim 14 wherein the hydroxy-functional polymer is selected from the group consisting of alkyd resins, polyester resins, acrylic resins, acrylic-alkyd hybrids or acrylic-polyester hybrids, polyether polymers, polyolefin polymers, or polyurethane polymers which may be selected from the group consisting of polyether-polyurethanes, polyester-polyurethanes, polycarbonate-polyurethanes, and polyolefin-polyurethanes, in the form of their solutions in organic solvents, and also, in the form of aqueous dispersions.

16. The coating compositions of claim 15 wherein the hydroxy-functional polymer has a glass transition temperature of not more than 45° C.

17. A process of making the coating compositions of claim 14 which process comprises the steps of charging a hydroxyfunctional polymer in the form of a solution or of an aqueous dispersion, and admixing thereto the reaction products A, or a mixture of the reaction products A and the crosslinker B, or at first, the reaction products A and then the crosslinker B, or at first the crosslinker B and then the reaction products A, and optionally, before, during or after addition of the crosslinkers, admixing further additives, or pigments or both.

18. A method of use of the coating composition of claim 14 to prepare coatings films on metal, wood, industrial wood, fabricated wood, metals, plastics, paper, cardboard, textiles, leather or mineral substrates.

* * * * *